US011396585B2

(12) United States Patent
Sottos et al.

(10) Patent No.: US 11,396,585 B2
(45) Date of Patent: Jul. 26, 2022

(54) METHOD OF FORMING A VOID, CHANNEL, AND/OR VASCULAR NETWORK IN A POLYMERIC MATRIX

(71) Applicant: The Board of Trustees of the University of Illinois, Urbana, IL (US)

(72) Inventors: Nancy R. Sottos, Champaign, IL (US); Mostafa Yourdkhani, Windsor, CO (US); Ian D. Robertson, Philadelphia, PA (US); Mayank Garg, Urbana, IL (US); Jeffrey S. Moore, Savoy, IL (US)

(73) Assignee: THE BOARD OF TRUSTEES OF THE UNIVERSITY OF ILLINOIS, Urbana, IL (US)

( * ) Notice: Subject to any disclaimer, the term of this patent is extended or adjusted under 35 U.S.C. 154(b) by 335 days.

(21) Appl. No.: 16/809,769

(22) Filed: Mar. 5, 2020

(65) Prior Publication Data

US 2020/0283594 A1     Sep. 10, 2020

Related U.S. Application Data

(60) Provisional application No. 62/814,378, filed on Mar. 6, 2019.

(51) Int. Cl.
*C08J 9/26*     (2006.01)
*C08G 61/02*     (2006.01)

(52) U.S. Cl.
CPC .............. *C08J 9/26* (2013.01); *C08G 61/02* (2013.01); *C08G 2261/1414* (2013.01);
(Continued)

(58) Field of Classification Search
None
See application file for complete search history.

(56) References Cited

U.S. PATENT DOCUMENTS 4,882,401 A    11/1989   Bell
5,929,129 A *   7/1999   Feichtinger ............... C08J 9/04
                                          521/142
(Continued)

OTHER PUBLICATIONS

Gergeley et al., "Multidimensional Vascularized Polymers using Degradable Sacrificial Templates,"*Advanced Functional Materials*, 25 (2015) pp. 1043-1052.
(Continued)

*Primary Examiner* — Kevin R Kruer
(74) *Attorney, Agent, or Firm* — Crowell & Moring LLP (57) ABSTRACT

A method of forming a void, channel and/or vascular network in a polymeric matrix comprises providing a pre-vascularized structure that includes a matrix material and a sacrificial material embedded in the matrix material in a predetermined pattern, where the matrix material comprises a monomer and the sacrificial material comprises a polymer. A region of the matrix material is activated to initiate an exothermic polymerization reaction and generate a self-propagating polymerization front. As the polymerization front propagates through the matrix material and polymerizes the monomer, heat from the exothermic reaction simultaneously degrades the sacrificial material into a gas-phase and/or liquid-phase byproduct. Thus, one or more voids or channels having the predetermined pattern are rapidly formed in the matrix material.

20 Claims, 8 Drawing Sheets

(52) U.S. Cl.
CPC . *C08G 2261/3325* (2013.01); *C08J 2201/042* (2013.01); *C08J 2365/00* (2013.01)

(56) References Cited

U.S. PATENT DOCUMENTS

| | | | | |
|---|---|---|---|---|
| 6,057,406 | A * | 5/2000 | Pojman | C08F 222/102 |
| | | | | 526/87 |
| 9,334,430 | B1 * | 5/2016 | Stevenson | C08L 27/06 |
| 10,081,715 | B2 | 9/2018 | White et al. | |
| 10,487,446 | B2 * | 11/2019 | Robertson | C08J 5/24 |
| 2006/0142512 | A1 * | 6/2006 | Pojman | C08F 222/102 |
| | | | | 526/318.43 |
| 2010/0129912 | A1 * | 5/2010 | Su | C08J 9/26 |
| | | | | 435/395 |
| 2011/0079389 | A1 * | 4/2011 | MacKay | E21B 33/138 |
| | | | | 166/281 |
| 2012/0302657 | A1 * | 11/2012 | Moszner | C08F 2/48 |
| | | | | 526/204 |
| 2013/0065042 | A1 | 3/2013 | Esser-Kahn et al. | |
| 2013/0189888 | A1 | 7/2013 | Patrick et al. | |
| 2014/0162519 | A1 | 6/2014 | Dong et al. | |
| 2015/0137416 | A1 | 5/2015 | Patrick et al. | |
| 2015/0152215 | A1 * | 6/2015 | Xie | C09J 5/06 |
| | | | | 422/138 |
| 2017/0260351 | A1 * | 9/2017 | Hayward | C08J 9/26 |
| 2018/0044488 | A1 * | 2/2018 | Takehara | B29C 70/443 |
| 2018/0055643 | A1 * | 3/2018 | Castro | B33Y 80/00 |
| 2018/0327531 | A1 | 11/2018 | Moore et al. | |
| 2019/0119462 | A1 * | 4/2019 | Desai | C08J 9/26 |
| 2020/0199322 | A1 * | 6/2020 | Sugawara | B05D 3/08 |
| 2020/0239658 | A1 * | 7/2020 | Ye | C08L 5/08 |
| 2020/0283594 | A1 * | 9/2020 | Sottos | C08J 9/26 |

OTHER PUBLICATIONS

Lee et al., "Tunable Thermal Degradation of Poly(vinyl butyl carbonate sulfone)s via Side-Chain Branching," *ACS Macro Letters*, 4 (2015) pp. 665-668.

Esser-Kahn et al., "Three-Dimensional Microvascular Fiber-Reinforced Composites," *Advanced Materials*, 23 (2011) pp. 3654-3658.

Ohlendorf et al., "Transient Fiber Mats of Electrospun Poly(Propylene Carbonate) Composites with Remarkable Mechanical Strength," *Applied Materials & Interfaces*, 9 (2017) pp. 25495-25505.

Robertson et al., "Rapid Energy-efficient Manufacturing of Polymers and Composites via Frontal Polymerization," *Nature*, 557 (2018) pp. 223-227.

Hernandez et al., "Triggered Transience of Metastable Poly(Phthalaldehyde) for Transient Electronics," *Advanced Materials*, 26 (2014) pp. 7637-7642.

* cited by examiner

METHOD OF FORMING A VOID, CHANNEL, AND/OR VASCULAR NETWORK IN A POLYMERIC MATRIX

RELATED APPLICATION

The present patent document claims the benefit of priority under 35 U.S.C. § 119(e) to U.S. Provisional Patent Application No. 62/814,378, which was filed on Mar. 6, 2019, and is hereby incorporated by reference in its entirety.

FEDERALLY SPONSORED RESEARCH OR DEVELOPMENT

This invention was made with government support under FA9550-16-1-0017 awarded by the Air Force Office of Scientific Research (AFOSR). The government has certain rights in the invention.

TECHNICAL FIELD

The present disclosure is related generally to polymer processing technology and more particularly to a method of forming one or more voids, channels and/or vascular networks in a polymeric matrix.

BACKGROUND

Various techniques have been employed in efforts to fabricate vascularized multifunctional materials, such as solder melt extraction, hollow glass fibers, removal of microcrystalline wax, and degradation of sacrificial thermoplastic templates. All the techniques have certain challenges related to integration of the materials, thermo-mechanical processing of the materials and the complexity of the vascular networks that can be created. An approach referred to as vaporization of sacrificial component (VaSC) using sacrificial polylactic acid (PLA) overcomes many of these challenges, but still requires high-temperature processing to remove the PLA. This processing adds to manufacturing time, requires additional energy inputs, and limits suitable matrices to those that can resist the >200° C. processing conditions.

BRIEF SUMMARY

An improved method of forming a void, channel and/or vascular network in a polymeric matrix is described.

The method includes providing a pre-vascularized structure that comprises a matrix material and a sacrificial material embedded in the matrix material in a predetermined pattern, where the matrix material comprises a monomer and the sacrificial material comprises a polymer. A region of the matrix material is activated to initiate an exothermic polymerization reaction and generate a self-propagating polymerization front. As the polymerization front propagates through the matrix material and polymerizes the monomer, heat from the exothermic reaction degrades the sacrificial material into a gas-phase and/or liquid-phase byproduct. Thus, one or more voids or channels having the predetermined pattern are rapidly formed in the matrix material.

BRIEF DESCRIPTION OF THE DRAWINGS

FIGS. 6A and 6B show thermal characterization of exemplary sacrificial and matrix materials. In particular.

FIGS. 13A-13C shows rapid vascularization in carbon fiber-reinforced composites using a liquid DCPD precursor, where

DETAILED DESCRIPTION

Described in this disclosure is a frontal polymerization method for the rapid formation of voids or channels, including microvascular networks, in structural polymers and fiber-reinforced polymer composites. To illustrate the method, a three-dimensional vascularized leaf structure is shown before, during and after a polymerization front moves through in FIGS. 1A-1C, respectively, to form a network of channels (veins) within the leaf. A key feature of the method is that vascularization occurs simultaneously or nearly simultaneously with polymerization as the polymerization front propagates through the structure.

Figure 1A:
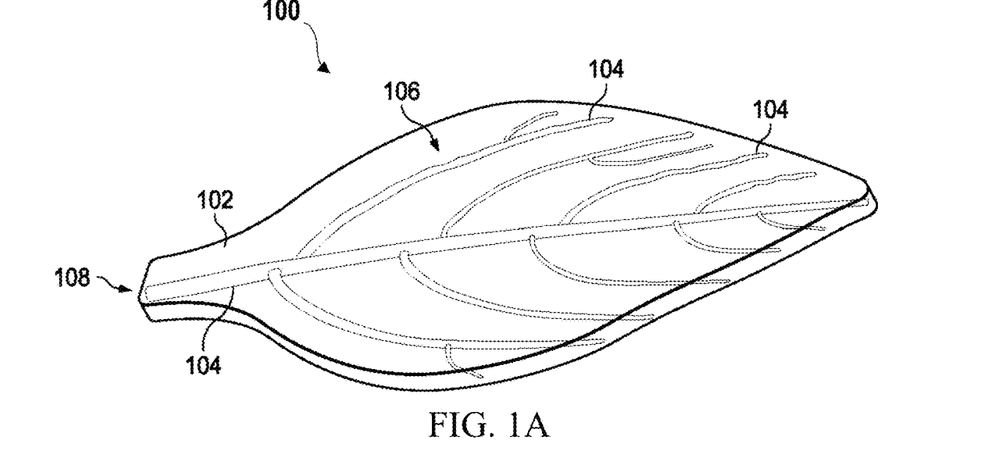
FIGS. 1A-1C are schematics of an exemplary three-dimensional vascular leaf structure prior to, during, and after frontal polymerization, respectively.
Figure 1B:
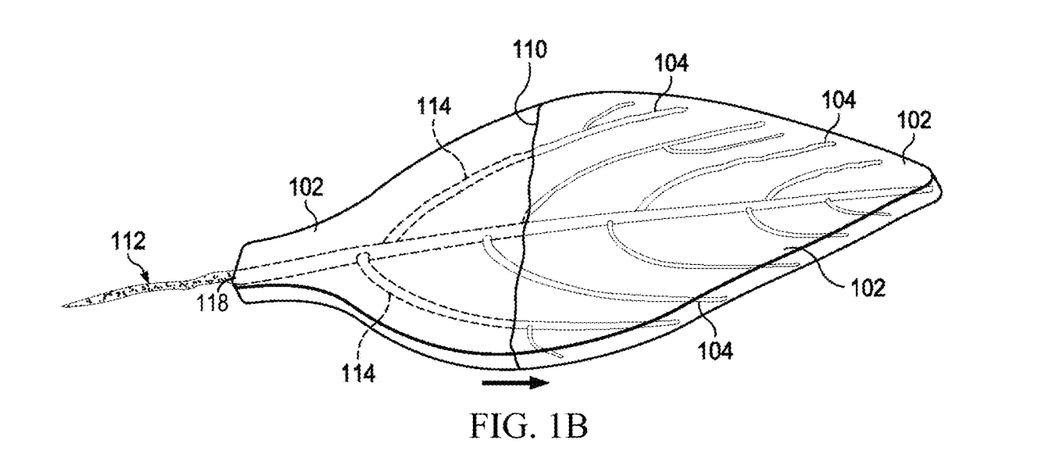

Referring to FIG. 1A, the method begins with what may be referred to as a pre-vascularized structure 100, which comprises a matrix material 102 and a sacrificial material (or "sacrificial template") 104 embedded in a predetermined pattern 106 in the matrix material 102. In other words, the sacrificial material 104 is embedded in a pattern 106 determined by the intended geometry of the channels or voids to be formed in the matrix material 102. The sacrificial material 104 comprises a polymer and the matrix material 102 comprises a monomer. A region 108 of the matrix material 102 is heated or otherwise activated to initiate an exothermic polymerization reaction and generate a self-propagating polymerization front 110, as shown in FIG. 1B, which moves through the matrix material 102 and effects frontal polymerization of the monomer. Typically, prior to propagation of the polymerization front 110, the matrix material 102 is in a liquid or gel state and the sacrificial material 104 is in a solid state. As the polymerization front 110 propagates, heat from the exothermic reaction simultaneously degrades the sacrificial material 104 into a gas- and/or liquid-phase byproduct 112, thereby forming one or more voids or channels 114 having the predetermined pattern 106 in the matrix material 102. In other words, as the polymerization front 110 moves through the matrix material 102, the sacrificial material 104 intersecting the front 110 undergoes rapid heating and decomposes into gaseous and/or liquid byproduct(s) 112, enabling the voids or channels 114 to form. A vascular or microvascular network may be created from interconnected channels 114. Accordingly, degradation of the sacrificial material 104 and polymerization of the matrix material 102 may be described as occurring simultaneously at and/or near the polymerization front 110. Simultaneous degradation of the sacrificial material 104 during frontal polymerization is advantageous for reducing processing time and energy use while allowing for the rapid creation of voids or channels 114 of any size, shape or pattern within the matrix material 102.

Figure 3:
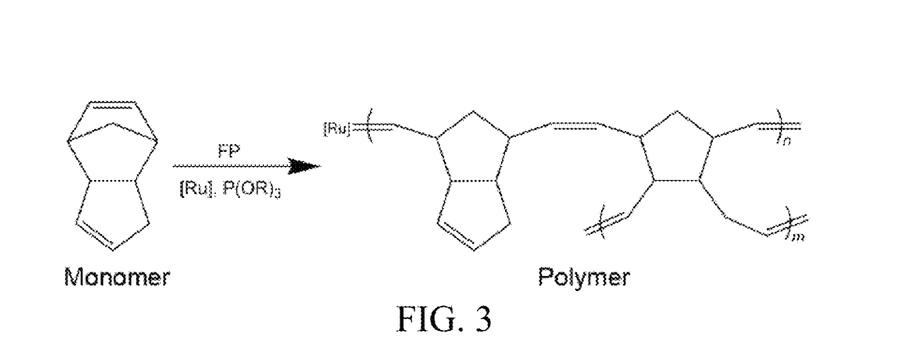
FIG. 3 shows a monomer and polymer (polydicyclopentadiene (poly(DCPD)) involved in an exemplary frontal polymerization reaction.

It is understood that the term "matrix material" 102 is used in reference to a monomeric material formulation that undergoes frontal polymerization as well as to the polymeric matrix formed upon frontal polymerization. In other words, the matrix material 102 may be in a pre-frontally-polymerized state or a post-frontally polymerized state, or an intermediate state. As indicated above, the matrix material prior to polymerization may be in a liquid or gelled state. For example, the matrix material may comprise an uncured monomer, a partially-cured monomer, a monomer gelled with a secondary gelling agent, and/or a monomer gelled with a rheology modifier. In one example, the matrix material may comprise the monomer dicyclopentadiene (DCPD) in a liquid or gelled state prior to frontal polymerization and the polymer polydicyclopentadiene (pDCPD or poly (DCPD)) following frontal polymerization, as illustrated in FIG. 3 and discussed further below. In some cases, it may be advantageous if the matrix material comprises a blend of DCPD and cyclooctadiene (COD). Generally speaking, after frontal polymerization, the matrix material may comprise an acrylate polymer, an epoxy polymer, a polyurethane, a thermoplastic, a thiolene polymer, and/or an olefin polymer (e.g., a cyclic olefin copolymer).

To obtain a matrix material 102 capable of frontal polymerization, it may be beneficial to include in the monomeric material formulation a catalyst and/or an inhibitor, each at a suitable concentration to influence the polymerization rate and the peak temperature of the matrix material 102. For example, more catalyst can be added or the inhibitor concentration can be reduced to increase the peak temperature and/or the speed of the polymerization front to ensure complete degradation of the sacrificial material during frontal polymerization. In one example, a suitable catalyst may comprise a $2^{nd}$ generation Grubbs catalyst (GC2) or another ruthenium catalyst, and an exemplary inhibitor may comprise a phosphite, such as trimethyl phosphite (TMP), triethyl phosphite (TEP), triisopropyl phosphite (TIPP), tributyl phosphite (TBP) and/or triphenyl phosphite (TPP), and/or 4-dimethylaminopyridine (DMAP). Catalyst ranges from about 50 ppm to about 300 ppm may be suitable, and inhibitor ranges from about 0.3 eq. to 8 eq. with respect to the catalyst may be employed; frontal polymerization of the matrix material may not occur in some cases for higher inhibitor concentrations. The sacrificial material 104 may also benefit from a catalyst or catalytic additive, such as one or more acids, bases or oxidizers, preferably in small concentrations, to reduce thermal stability and facilitate complete degradation at lower temperatures.

Figure 2:
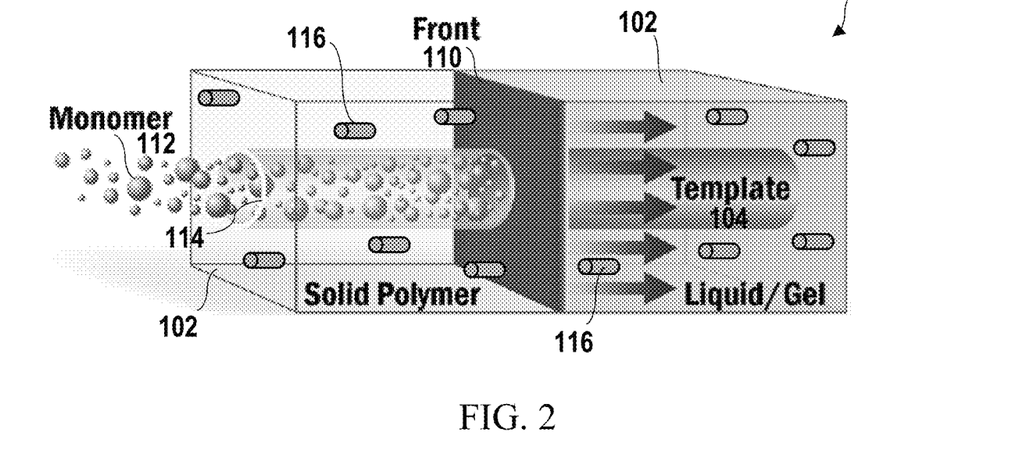
FIG. 2 is a schematic of a simple composite structure undergoing frontal polymerization.

In addition to the sacrificial material or template 104, a reinforcement material 116 may be embedded in the matrix material 102 to create a composite structure. FIG. 2 shows a simple composite structure 200 undergoing frontal polymerization and consequently vascularization. The reinforcement material 116 may comprise one or more fibers, tows, and/or fabrics comprising carbon, glass, metal, ceramic, Kevlar, and/or other material. In contrast to the sacrificial material 104, the reinforcement material 116 is not degraded or otherwise removed during frontal polymerization. Instead, the reinforcement material 116 remains in the matrix material 102 as the voids or channels 114 are formed during polymerization, and thus is available to serve as a structural or functional reinforcement for the matrix material 102 during and/or after frontal polymerization.

As described above, the exothermic polymerization reaction may be activated by heating a local or global region (referred to as "the region") of the matrix material or, in some cases, by exposing the region to light, electric current or another activator. Heating to initiate the exothermic polymerization reaction may be transient, lasting for less than five minutes, less than one minute, or even less than one second. In other words, after initiation of the exothermic polymerization reaction, no external heating is required. Heat may be applied by conduction, convection, or radiation. For example, heat may be applied conductively by physically contacting a heated element (such as a soldering iron, electrical resistive heater, resistive wire, hot plate, etc.) to the matrix material at one or more locations. Also or alternatively, heat may be applied by flash heating or illuminating the matrix material. Activation of the local or global region of the matrix material by any mechanism (e.g., heating, light illumination and/or electricity) may encompass activating one or more points on the surface of the matrix material, activating one, more, or all entire surfaces of the matrix material, or activation from within the matrix material, such as from an embedded heating element (e.g., resistive heating via an embedded wire).

Advantageously, frontal polymerization may occur rapidly. For example, the polymerization front 110 may move through the matrix material 102 at a rate of at least about 3 cm/min, at least about 10 cm/min, and in some cases as high as, or even higher than, about 20 cm/min. Depending on the matrix material and possibly other factors, the rate of propagation of the polymerization front may range from 0.5 cm/min to about 20 cm/min or higher. The polymerization front 110 may have a linear shape as illustrated in FIG. 1B, or another shape, such as a curved shape, which may be influenced by the geometry of the region 108 where polymerization is initiated, the type of matrix material 102, and/or other factors. Typically the polymerization front 110 is smooth and stable, but in some cases the polymerization front 110 may exhibit irregularities or instabilities as it propagates through the matrix material 102. The direction of propagation of the front 110 may be referred to as a downstream direction.

The matrix material 102 at the polymerization front 110 may reach a temperature in a range from about 100° C. to about 300° C. In contrast, downstream of the polymerization front 110, the matrix material 102 may be at room temperature (e.g., 20-25° C.) or at another temperature above or below room temperature that is well below the temperature at the polymerization front 110. Typically, the temperature at the polymerization front is in the range from about 120° C. to about 180° C., or from about 120° C. to about 150° C. Notably, in contrast to prior work, the entire matrix material need not undergo external heating to a high temperature (e.g., 200° C. or higher) for polymerization to occur; instead, the matrix material undergoes localized heating as the polymerization front propagates. Generally speaking, and as in the examples below, the matrix material 102 may be at room or ambient temperature (e.g., 18-25° C.) and under ambient conditions (e.g., atmospheric pressure) prior to initiation of frontal polymerization. Advantageously, after frontal polymerization, heat dissipates rapidly. In one example, after passage of the polymerization front 110, the matrix material 102 may cool to below 100° C. within about two minutes, and/or to below 60° C. within about four minutes.

Figure 4:
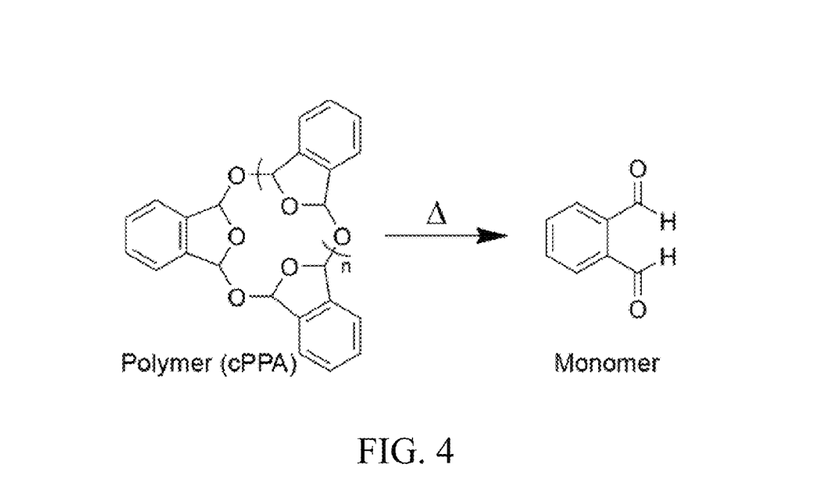
FIG. 4 shows a polymer (cyclic poly(phthalaldehyde) (cPPA)) and monomer involved in an exemplary degradation reaction.
Figure 5:
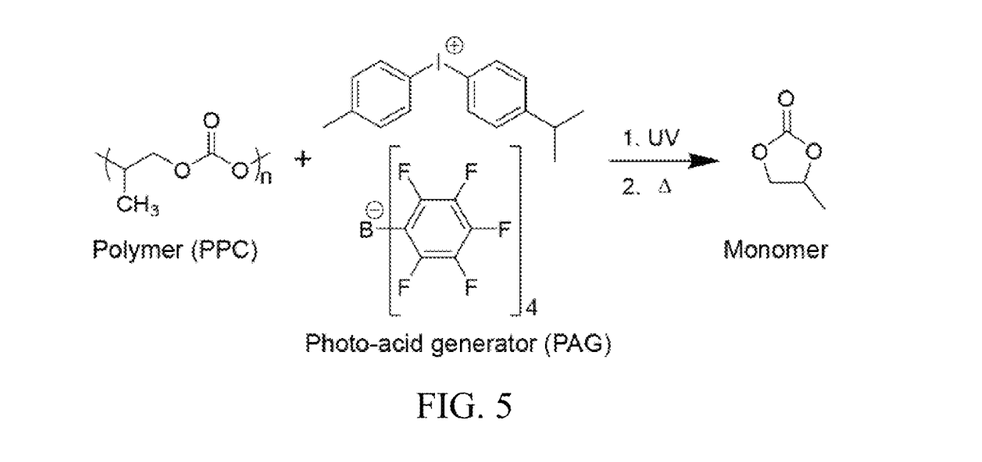
FIG. 5 shows a polymer (poly(propylene carbonate) (PPC)), photo-acid generator and monomer involved in an exemplary degradation reaction.

As a consequence of heating from the exothermic reaction that accompanies polymerization, the sacrificial material 104, which comprises a polymer, is degraded, decomposed or depolymerized into a gaseous and/or liquid byproduct 112 that may comprise a monomer or small molecule. An exemplary degradation reaction is shown in FIG. 4. Typically, as mentioned above, the sacrificial material 104 is in a solid state prior to degradation. The sacrificial material 104 may comprise a thermoplastic or metastable polymer, such as cyclic poly(pthalaldehyde) (cPPA), poly(vinyl butyl carbonate sulfone)s, and/or poly(propylene carbonate) (PPC). In some cases, the sacrificial material 104 may further comprise a catalytic additive, as mentioned above, such as a photo-acid generator, a thermal acid generator, a photobase generator, a thermo-base generator, and/or an organometallic catalyst, to facilitate degradation when exposed to heat from the exothermic reaction. This may be important for more stable sacrificial materials, such as PPC. For example, PPC or another aliphatic polycarbonate (e.g., polyethylene carbonate (PEC) or polybutylene carbonate (PBC)) may be utilized with a photo-acid generator and exposed to light (e.g., UV light) prior to heating, as shown schematically in FIG. 5, and even prior to embedding in the matrix material 102, such that upon exposure to heat, degradation occurs rapidly.

Figure 1C:
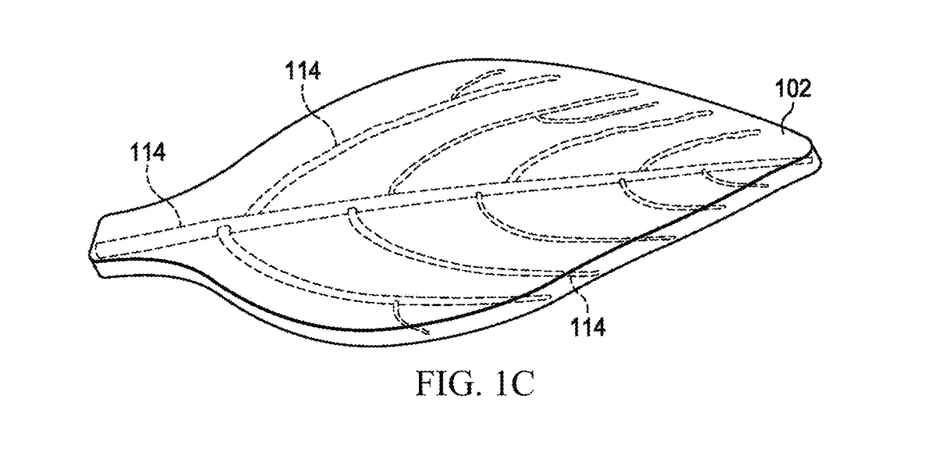

Surprisingly, and despite the rapid polymerization and degradation reactions and the liquid or malleable state of the matrix material 102 immediately downstream of the polymerization front 110, the size, geometry and pattern of the void(s) 114 formed in the matrix material 102 closely resemble if not exactly replicate those of the sacrificial material 104. The polymerization method may be used to vascularize matrix materials 102 featuring sacrificial materials 104 in the form of wires or other shapes with large bulk masses. For example, the method has been demonstrated for sacrificial material wires with thicknesses as large as 1.6 mm and for sacrificial material films as wide as 5 mm, where the polymerization front travels in a direction parallel to the length of the wire. Generally speaking, each of the one or more voids or channels 114 formed in the matrix material 102 may comprise a linear dimension (e.g., width or diameter) as large as up to 5 mm or up to 1 cm. As shown in FIGS. 1A-1C, in some cases the one or more voids or channels 114 may take the form of a microvascular network. The channel(s) 114 may have a circular or other cross-sectional shape.

One advantage of the frontal polymerization process described in this disclosure is that the degradation product(s) 114 of the sacrificial material 104 typically do not deform or cause bubble formation in the simultaneously solidifying surrounding matrix material 102. In addition, there are typically no observable side chemical reactions that could inhibit or prevent polymerization of the matrix material 102, inhibit or prevent degradation of the sacrificial material 104, and/or lead to defects, instability, or collapse of voids 114 within the matrix material 102. Even more surprisingly, vascularization or creation of voids 114 (preferably without defects, instability, collapse, etc.) may be observed even when the sacrificial material 104 is completely surrounded by the matrix material 102 before initiating frontal polymerization, in other words, even when the sacrificial material 104 is completely (as opposed to partially) embedded in the matrix material 102. Additionally, in an example where the sacrificial material 104 is partially embedded in the matrix material 102, such that the one or more voids or channels 114 formed upon degradation include a vent or opening 118 for escape of the byproduct(s) 112, as illustrated in FIG. 1B, a vacuum or other means of actively removing the byproduct 112 is not required (but may be employed if desired).

To form the matrix material 102 with the sacrificial material 104 embedded therein, the sacrificial material may first be fabricated on a substrate or template in the predetermined pattern, that is, in a one-, two- or three-dimensional pattern determined by the intended geometry of the channels or voids to be formed in the matrix material. Next, the sacrificial material may be immersed in or otherwise exposed to the matrix material, prior to polymerization, to achieve partial or full encapsulation within the matrix material. For example, in a first step, a sacrificial material precursor comprising a polymer solution or a molten polymer may be controllably deposited onto the substrate or template, followed by cooling or drying to form the sacrificial material arranged in the pattern. The cooling may entail solidifying the molten polymer, whereas drying may be employed to remove solvent from the polymer solution. In a second step, the sacrificial material may be exposed to the matrix material to achieve partial or full encapsulation of the sacrificial material, thereby forming the matrix material with the sacrificial material embedded therein. As would be recognized by the skilled artisan, exposing the sacrificial material to the matrix material may comprise flowing, pouring or spraying the matrix material over the sacrificial material, immersing the sacrificial material in the matrix material, or another suitable method.

Controllably depositing the sacrificial material precursor onto the substrate or template may comprise 3D printing, electrospinning, melt spinning, solvent or solution spinning, film deposition and patterning, and/or extrusion of a polymer solution or melt. Sacrificial materials 104 in the form of films, fibers, and printed networks of various geometries and dimensions have been successfully embedded in matrix materials 102 and vascularized to create channels or microchannels 114, as described below. The sacrificial templates shown as examples here in no way limit the range of possible sacrificial material configurations or form factors, which may be one-, two-, or three-dimensions and may be either fully or partially embedded within the matrix material 102, with or without openings to the environment or another material.

Preferably, the mechanical integrity of the sacrificial material 104 or sacrificial material precursor is sufficient to permit integration into the matrix material 102, preferably without additional supports, encapsulant layers or scaffolds, and without deformation or fracture under thermo-mechanical stress during processes such as vacuum assisted resin transfer molding (VARTM).

In some embodiments, the sacrificial template may have sufficient mechanical integrity as described above to support a hierarchical, three-dimensional network inspired from biology. Such microvascular networks may be described as arrays of microscopic channels embedded in a matrix material that allow facile transport of fluid along their length. Microvascular networks can enable the matrix material (or "host material") to perform functions such as thermal regulation, self-healing, electromagnetic modulation, and/or others. Microvascular networks are known to enable efficient transport and delivery of beneficial liquids in structural polymers and composites for active functions such as self-healing, thermal regulation, and electromagnetic modulation. The frontal polymerization process described in this disclosure permits the simultaneous curing of the matrix material and creation of embedded voids or channels (or microvascular networks) with minimal external energy input (e.g., at or near room temperature) in a short time (e.g., minutes) without the use of a vacuum oven. In examples described below, sacrificial templates comprising a metastable polymer are embedded in a matrix material comprising a monomer solution that can solidify via frontal polymerization. The exothermic reaction heat of frontal polymerization is used to rapidly depolymerize the sacrificial template at the reaction front (polymerization front) without affecting other regions. Accordingly, the method may enable rapid fabrication of microfluidic devices for various research and diagnostic purposes and/or commercial applications, in contrast to existing fabrication methods, which are associated with prolonged fabrication times, high temperature requirements, and other shortcomings.

EXAMPLES

FIGS. 1A-1C, which were described in detail above, are summarized here prior to discussing a number of experimental examples. FIGS. 1A-1C illustrate the frontal polymerization process, which begins with a sacrificial template 104 that is at least partially surrounded by a matrix material 102 which is (1) stable at the processing temperature (for example, room temperature) and also (2) capable of undergoing a self-propagating exothermic polymerization into a solid from a gel and/or liquid state upon exposure to a localized trigger or stimulus (e.g., heat, light, or current). The polymerization front 110 may propagate autonomously once it is initiated, and thus the initiating stimulus may be discontinued after the polymerization front 110 is initiated.

The sacrificial material 104 is chosen such that the exothermic heat released during frontal polymerization is sufficient to depolymerize the embedded sacrificial template 104 into liquid and/or gaseous degradation products which may optionally be removed to yield a vacant void or microchannel 114.

As discussed above, a variety of precursors, including acrylates, epoxies, polyurethanes, and olefins are capable of undergoing exothermic frontal polymerization and can be used as matrix materials (or "host matrices") for this concept. The examples described here feature a formulation based on a combination of endo-dicyclopentadiene (DCPD) containing 5 wt. % 5-ethylidene-2-norborene (ENB), $2^{nd}$ generation Grubbs catalyst (GC2), and tributyl phosphite (TBP) inhibitor which are incubated under various conditions to obtain liquid and/or gel DCPD mixtures capable of frontal polymerization. Several transient polymers, such as cyclic poly(pthalaldehyde) (cPPA), poly (vinyl butyl carbonate sulfone)s, and poly(propylene carbonate) (PPC) optionally blended with an acid generator, are capable of rapid depolymerization at relatively low temperatures and can act as sacrificial templates for this rapid vascularization process.

Matrix Materials

Frontal polymerization may utilize a matrix material that is in either a liquid, gel, or near-solid (uncured) state. Unless stated otherwise, the examples described here utilize a stiff DCPD gel. Since DCPD is typically solid at room temperature, 5 wt. % 5-ethylidene-2-norborene (ENB) is mixed with DCPD at 35° C. to make a liquid monomer solution. For making stiff gels with an embedded sacrificial template, 100 ppm of GC2 (dispersed in phenylcyclohexane) and two equivalents of TBP (with respect to GC2) are dissolved in the monomer solution. The mixture is poured into a rectangular glass mold with polyurethane gasket spacers holding the sacrificial cPPA template in place. The solution is transferred to an environmental chamber and allowed to gel at 25° C. and 30% RH for 14.5 hours. The gel with the embedded sacrificial template is removed from the mold and locally exposed to a heat source to start the rapid solidification reaction that also initiates the degradation of cPPA for simultaneous vascularization. The heat source is removed as soon as the reaction front is initiated.

Fiber-Reinforced Composites

For making fiber-reinforced composites, liquid DCPD mixture containing 100 ppm GC2 and 0.3 eq TBP is prepared. Ten layers of carbon fiber fabric reinforcement with a PPC (3% photo acid generator) fiber embedded between the 5th and 6th are used in a press-assisted hand layup setup to make fiber-reinforced composites using liquid DCPD, as discussed below in reference to FIGS. 13A-13C. Alternative composites manufacturing methods such as resin transfer molding (RTM) or vacuum assisted resin transfer molding (VARTM) or others may be used for this process. Alternative fiber-based or non-fiber-based materials may be used in place of or in addition to the carbon fiber fabric, including glass, metal, ceramic, Kevlar, and/or other fibers. These materials may serve as reinforcement materials within the resulting composite material.

Sacrificial Materials

Solid cPPA is synthesized in-lab using ortho-phthalaldehyde monomer, and cPPA sacrificial materials (films) are made by dissolving solid cPPA in dichloromethane solvent followed by casting in a Teflon-lined petri dish and subsequently laser-cutting into the desired templates. Fibers and printed structures are obtained by dissolving synthesized cPPA in tetrahydrofuran solvent and subsequently extruding in a methanol coagulation bath.

PPC fibers are made by melt blending commercially available PPC pellets with a small amount of latent acid at 140° C. in a melt-compounder, followed by melt spinning at 155° C. into desired fiber diameters. The range of latent acid may be 0.1 wt. % to 20 wt. %. Preferably, the range is 0.1 wt. % to 10 wt. %. More preferably, the range is 0.5 wt. % to 5 wt. %, with this latter range demonstrated to be effective in the inventors' laboratory testing.

Frontal Polymerization Results

The present method has been demonstrated repeatedly at the laboratory scale using sacrificial templates processed via a variety of methods, including solvent casting, solvent spinning, solvent-cast printing, melt spinning, and 3D printing. These or any of a number of other methods may be used to process sacrificial templates. Films, fibers and printed networks of various geometries and dimensions are successfully embedded and vascularized to create microchannels in (1) a neat thermoset matrix using DCPD gel scaffolds and (2) an aerospace-grade fiber-reinforced composite using liquid DCPD, as described below. The sacrificial templates shown as examples herein in no way limit the range of possible template configurations or form factors, which may be one, two, or three dimensions and may be either fully or partially embedded within the matrix material, with or without openings to the environment or another material.

Preferably, the mechanical integrity of the sacrificial template is sufficient such that the sacrificial template may be integrated into the matrix material without additional supports, encapsulant layers, or scaffolds and/or without deforming/breakage under thermo-mechanical stress during processes such as VARTM. The sacrificial template may have sufficient mechanical integrity to support a hierarchical, three-dimensional network inspired from biology without deforming or breaking during processing. In one example, PPC is employed for fibers with sufficient mechanical strength to allow embedding the fibers in DCPD gels and/or carbon-fiber reinforced composites for rapid vascularization during frontal polymerization.

Figure 6A:
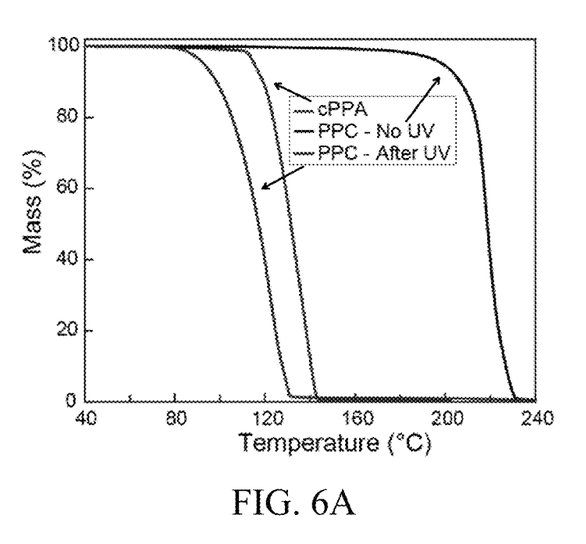
FIG. 6A shows mass loss of cPPA and PPC via thermogravimetric analysis (TGA) and reveals complete degradation of the solid polymers into volatile products at temperatures relevant to frontal polymerization.
Figure 6B:
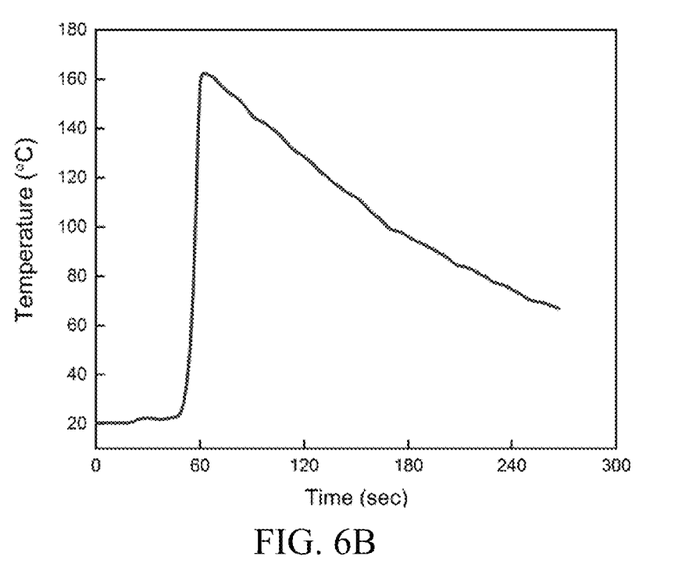
FIG. 6B shows the temperature of a local region in a dicyclopentadiene-based (DCPD) gel as measured by a thermocouple in contact with the propagating solidification front during frontal polymerization.

FIGS. 6A and 6B show thermal characterization of exemplary sacrificial and matrix materials. The sacrificial material preferably depolymerizes rapidly within the temperature window supplied by the frontal polymerization reaction. The dynamic thermogravimetric analysis (TGA) graph in FIG. 6A shows vaporization of cPPA and PPC (1% photo-acid generator (PAG)) depolymerization products (shown by mass loss) within 100-140° C. The PAG is a latent acid that may become an acid only upon exposure to UV light. Many acids and/or bases could be used as alternatives to PAG. Comparable deterioration of PLA cannot be achieved at such temperatures. Other sacrificial materials may degrade at lower temperatures, including between 25 to 200° C. In comparison, the peak temperature of a polymerization front within DCPD gel with the given catalyst and inhibitor formulation (100 ppm GC2 and 2 eq TBP) varies between 120-180° C. followed by rapid convective cooling to room temperature, as shown in FIG. 6B. A cuboid shaped gel specimen measuring 50 mm×20 mm×6 mm is used for the measurements with the long edge in contact with a glass plate under ambient conditions. The peak polymerization front of DCPD gel with other catalyst and inhibitor formulations may range from 100° C. to 200° C. The peak polymerization front of other matrix materials may range from −270° C. to 300° C. Thermal degradation of polymers such as cPPA, PPC, and other sacrificial materials within the temperature ranges of the peak polymerization front temperatures can make them suitable for use in the present method.

Figure 7:
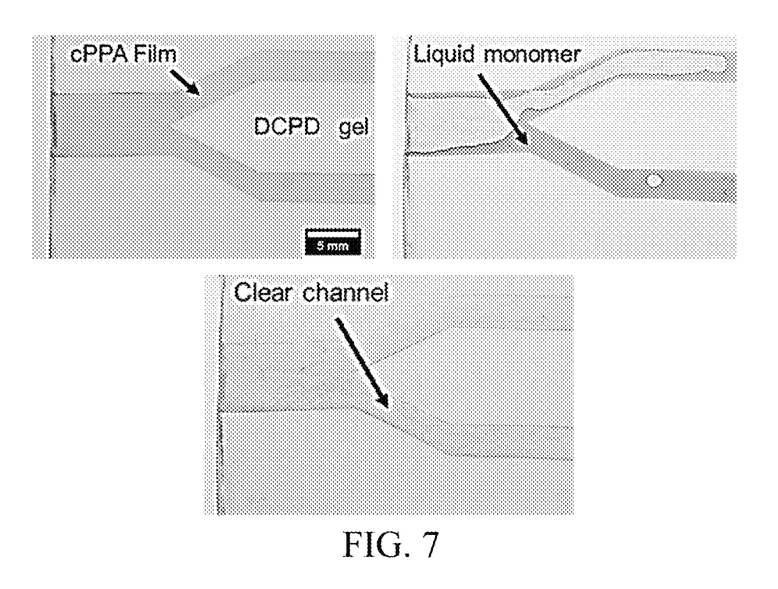
FIG. 7 shows rapid vascularization of a DCPD-based gel with an embedded bifurcating cPPA film (sacrificial template) before frontal polymerization (left image), after frontal polymerization (right image), and after flushing the frontally polymerized sample with solvent (bottom image).

FIG. 7 shows an example where rapid vascularization is achieved using a cPPA film. In this example, the cPPA films are made using a solvent casting procedure and templates are laser cut into the desired shape. A bifurcating cPPA template is embedded inside a partially cured DCPD gel using the cell-casting procedure. The film starts depolymerizing into liquid and gaseous products during polymerization of the matrix material via frontal polymerization initiated by a localized thermal trigger. Microchannels as wide as 5 mm are demonstrated in a high-temperature resistant thermoset matrix within minutes at room temperature under ambient conditions using this method. In contrast to conventional methods, a heated vacuum oven and/or prolonged processing times (hours to days) are not required to achieve vascularization.

Figure 8:
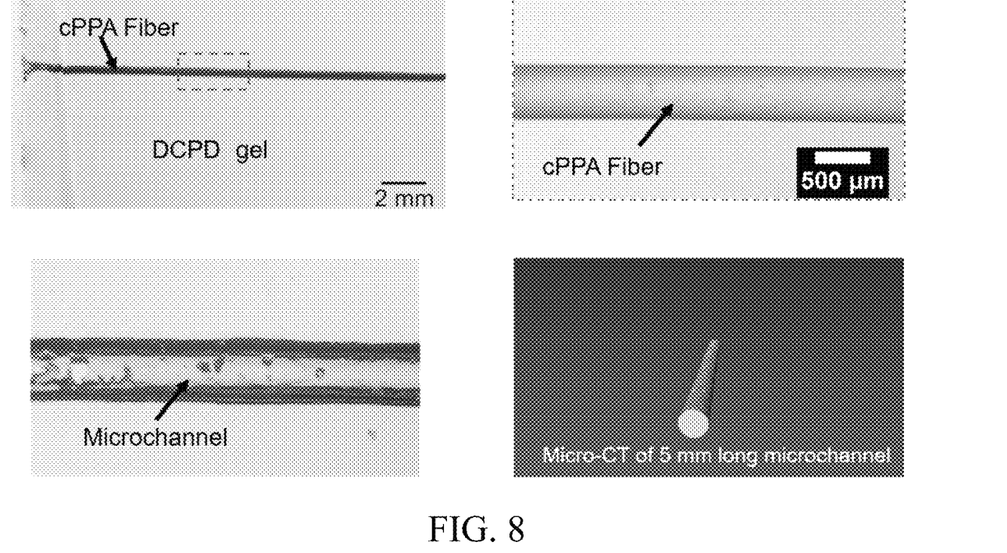
FIG. 8 shows rapid vascularization during frontal polymerization solidification of a DCPD gel with an embedded cPPA fiber of 500 µm in diameter, where the upper left image shows the cPPA fiber embedded in the DCPD gel as frontal polymerization is initiated, the upper right image shows a magnified view of the cPPA fiber, the lower left image shows a microchannel formed within the matrix material following frontal polymerization, and the bottom right image shows reconstruction of the resulting microchannel volume using micro-computer tomography (micro-CT).

FIG. 8 shows an example where rapid vascularization is achieved using a cPPA fiber. The top images show the pre-vascularized structure prior to frontal polymerization, and the bottom images show the microchannels formed as a consequence of frontal polymerization. Sacrificial materials such as cPPA may be processed into various template types, including fibers, printed structures, and more to facilitate creation of voids of all shapes, sizes, and configurations, including complex, interconnected vascular architectures that may mediate transport of functional fluids for applications such as self-healing, self-cooling, and electromagnetic modulation. For example, cPPA can be processed into fibers of varying diameter (e.g., 100 µm to 1.6 mm) using solution spinning, and these fibers can be embedded into DCPD gels for making specimens that can be subsequently vascularized within minutes during frontal polymerization without using a vacuum oven. Other processing methods may be used to create cPPA or other sacrificial fibers with diameter ranging from 1 µm to 1 cm. Fibers may be arbitrarily long, on the scale of meters or more. Surprisingly, the circularity and dimensions of the resulting channel closely resemble the original cPPA template, as shown in the micro-CT image, without any deformation/bubbles in the surrounding poly (DCPD) matrix. Also, no side chemical reactions between the degradation products of the sacrificial material and the matrix material are observed. Such reactions could prevent the polymerization front from propagating, cause deformation, or induce defects, bubbles, or contamination of the resulting voids, etc.

Figure 9:
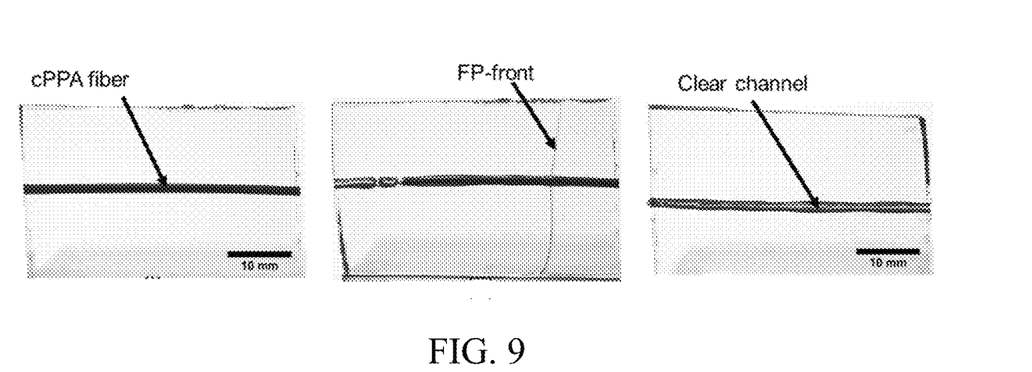
FIG. 9 shows rapid vascularization of a DCPD gel including a cPPA fiber of 1.6 mm in diameter before frontal polymerization (left image), during frontal polymerization (middle image), and after flushing the frontally polymerized sample with solvent (right image).

FIG. 9 shows an example where rapid vascularization is achieved using a cPPA fiber with a 1.6 mm diameter. In this example, the cPPA fiber is successfully degraded to create a microchannel in a poly(DCPD) matrix during frontal polymerization. The image on the left shows the pre-vascularized structure including the cPPA fiber, the image in the middle shows the polymerization front moving through the structure, and the image on the right shows the vascularized structure after front polymerization.

Figure 10:
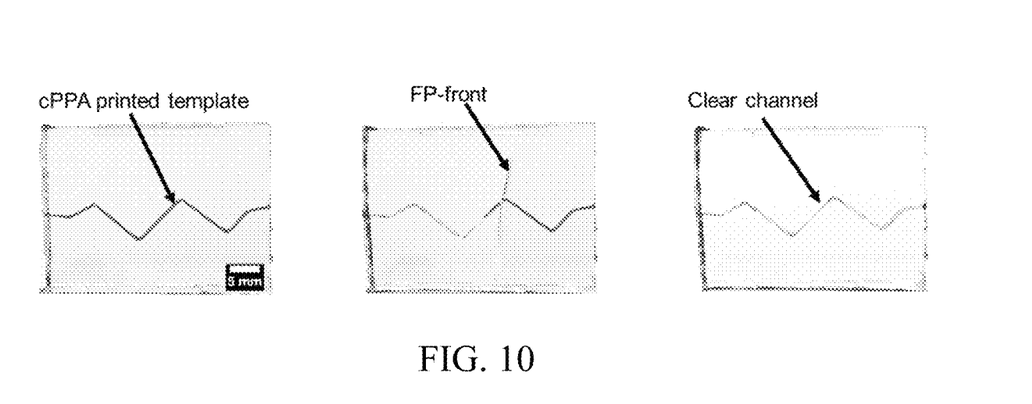
FIG. 10 shows rapid vascularization during frontal polymerization solidification of a DCPD-based gel with an embedded cPPA printed pattern before frontal polymerization (left image), during frontal polymerization (middle image) and after flushing the frontally polymerized sample with solvent (right image).

FIG. 10 shows an example where rapid vascularization is achieved using a cPPA printed pattern. Printed sacrificial templates of cPPA may be used to create vascular thermoset polymers which can be useful for a variety of microfluidic or other devices. The printed cPPA sacrificial template is embedded in a DCPD gel scaffold using a cell-casting procedure, as shown in the image on the left, followed by triggering frontal polymerization using a localized heat trigger, as shown in the middle image, and resulting in a vascularized structure, as shown in the image on the right.

Figure 11:
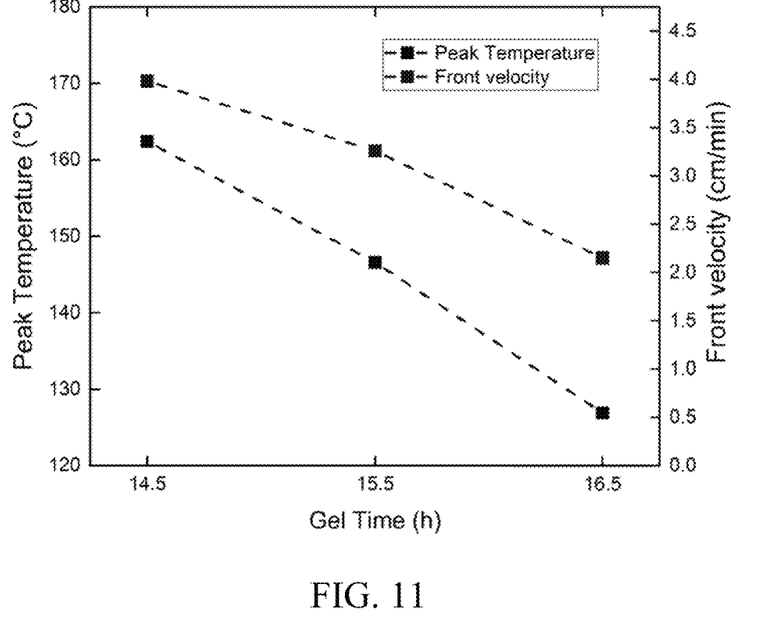
FIG. 11 shows pot-life of a gel composition allowing for successful vascularization.

FIG. 11 shows the pot-life of the DCPD gel composition for which successful vascularization via frontal polymerization is demonstrated. An increase in gel time (from 14.5 to 16.5 hours) of the DCPD gel before triggering the exothermic solidification reaction is associated with a decrease in peak temperature and front velocity. For a gel time of 17.5 hours, rapid vascularization is unsuccessful in this example, as the exothermic heat from the solidification reaction is insufficient to degrade the cPPA template. The DCPD mixture is allowed to set for 14.5 to 16.5 hours for the embodiments shown; other DCPD compositions may feature shorter or longer gel times, as may other matrix materials. For example, some compositions may feature gel times as low as 10 hours, 5 hours, 1 hour, 1 minute, or 1 second. In some embodiments, the matrix material may be used in liquid form and need not set into a gel phase.

Formulations of DCPD may have different pot-lives depending upon the concentration of the catalyst and the inhibitor, the incubation time and temperature, and other factors. For a given catalyst and inhibitor concentration, an increase in the incubation time before triggering the frontal polymerization reaction typically results in a decrease in the heat released and the speed of the polymerization front during frontal polymerization. For such matrix materials, after a certain incubation time, the heat release during frontal polymerization may be insufficient to degrade the sacrificial template completely, resulting in blocked channels, voids partially or wholly filled with the sacrificial material, and/or solid sacrificial material pieces within the void. In some embodiments, partial degradation of the sacrificial material may be sufficient or even desirable. For other embodiments, partial degradation may be problematic. In such embodiments, the problem can be mitigated using one or both of the following strategies: First, the peak temperature and the front velocity during frontal polymerization can be increased by increasing the catalyst concentration or by reducing the inhibitor concentration. Second, the sacrificial material can be made more thermally unstable by blending it with additives before processing into different templates. Third, the surrounding environment can be altered to retain more heat during and post frontal polymerization. Thermally insulating the matrix material under vacuum or by surrounding with foam, for example, can minimize heat loss due to convection and allow for a longer heat retention time. Alternatively, increasing the surrounding temperature may slow down the cooling of the matrix material after frontal polymerization.

Figure 12:
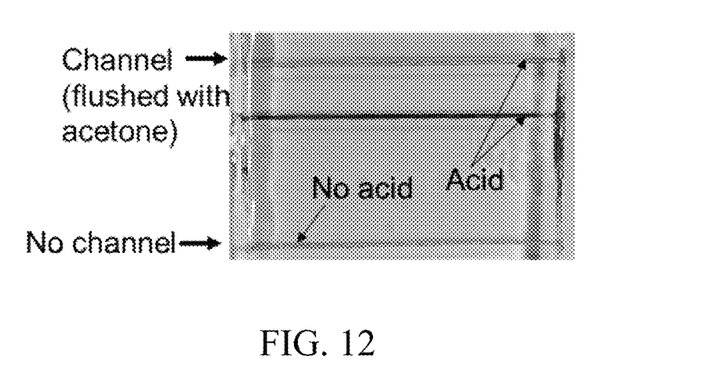
FIG. 12 shows vascularization of a DCPD gel using PPC fibers with 1 wt. % acid.

FIG. 12 shows an example where rapid vascularization is achieved using a PPC fiber. As shown in the dynamic TGA in FIG. 6A, PPC blended with small amount of latent acid catalyst (e.g., a photo-acid generator (PAG)) may degrade in a similar temperature range as cPPA, making it another suitable polymer for rapid vascularization. For the example in FIG. 12, PPC fibers are embedded in a DCPD gel using the cell-casting procedure previously mentioned. Fibers containing active acid degrade during frontal polymerization and result in clear channels in contrast to fibers containing latent catalyst (before UV exposure) which may result in blocked channels. The amount of latent acid catalyst employed is preferably between 0.1 wt. % to 10 wt. %, and more preferably is between 0.5 wt. % to 5 wt. %.

Figure 13A:
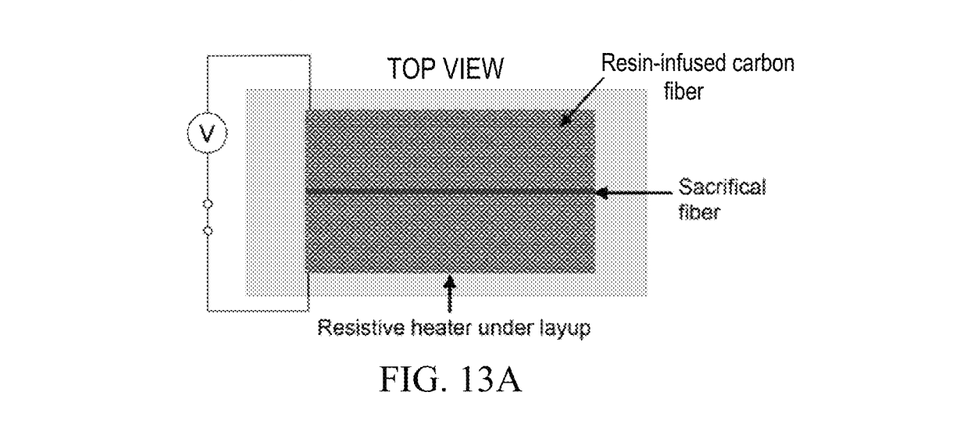
FIG. 13A shows the composite lay-up scheme before frontal polymerization.
Figure 13B:
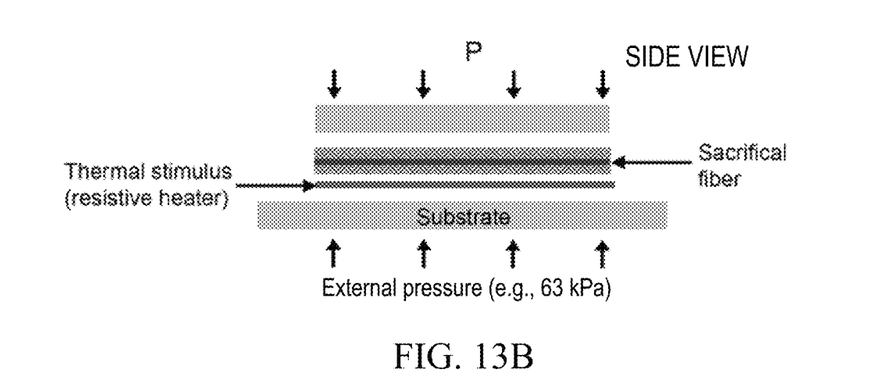
FIG. 13B shows a side view of the composite lay-up scheme before frontal polymerization.
Figure 13C:
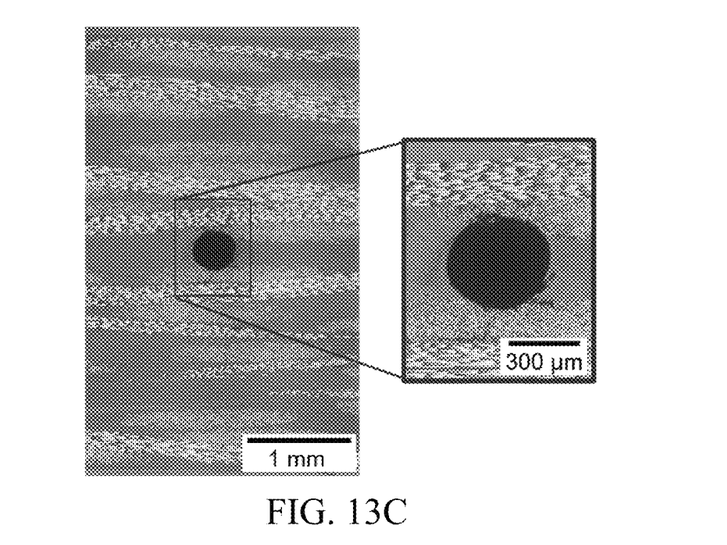
FIG. 13C shows a cross-section of the composite with an embedded microchannel after frontal polymerization.

FIGS. 13A-13C show an example where rapid vascularization is achieved in fiber-reinforced composites. In this example, a liquid DCPD solution is used to create vascular fiber-reinforced composites using a press-assisted hand layup setup, and a PPC fiber (3% PAG) is sandwiched between 10 layers of carbon fiber fabric and infused with a liquid DCPD mixture containing 100 ppm GC2 and 0.3 eq TBP, as shown in FIGS. 13A and 13B. Frontal polymerization is triggered using a resistive heater present below the carbon fiber fabric layers. Surprisingly, the PPC fiber degrades and results in a clear channel, as shown in FIG. 13C, even though the sacrificial template is surrounded by fabric on all sides. This is in contrast with conventional techniques, where an opening in a host matrix is needed to remove gaseous degradation products of a sacrificial template using a vacuum oven. Thus, microvascular composites for applications like self-healing and self-cooling could be manufactured within minutes instead of hours or days using minimal energy input at room temperature via the frontal polymerization method described herein.

Figure 14A:
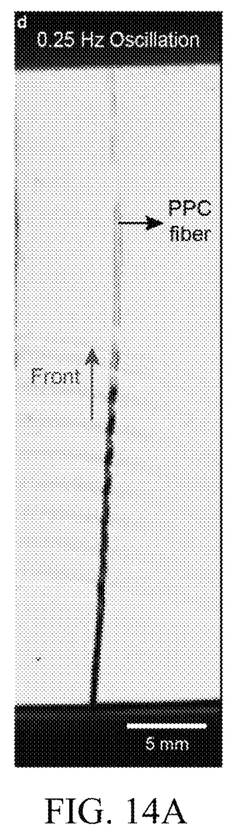
FIG. 14A shows a video snapshot of a DCPD gel with embedded PPC fiber during frontal polymerization while under an oscillatory deformation parallel to the fiber.
Figure 14B:
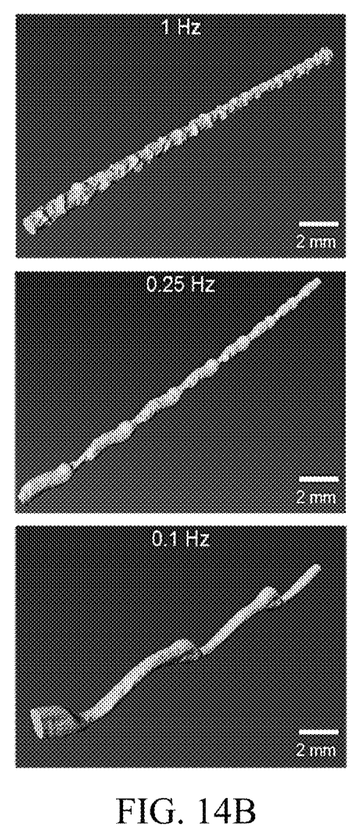
FIG. 14B shows images providing a 3D reconstruction of micro-channels formed under an oscillatory deformation of a fixed amplitude but varying frequency.

FIGS. 14A-14B show that an embedded sacrificial material in the form of a straight fiber may be made to take on a sinusoidal geometry by imposing an oscillatory deformation parallel to a longitudinal axis of the fiber during frontal polymerization. FIG. 14A shows a video snapshot of a DCPD gel with embedded PPC fiber during frontal polymerization while under oscillatory deformation. FIG. 14B shows images providing a 3D reconstruction of microchannels formed under an oscillatory deformation of a fixed amplitude but varying frequency (1 Hz, top; 0.25 Hz, middle, and 0.1 Hz, bottom image).

Although the present invention has been described in considerable detail with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein.

Furthermore, the advantages described above are not necessarily the only advantages of the invention, and it is not necessarily expected that all of the described advantages will be achieved with every embodiment of the invention.

The invention claimed is:

1. A method of forming a void, channel and/or vascular network in a polymeric matrix, the method comprising:
   providing a pre-vascularized structure comprising:
      a matrix material; and
      a sacrificial material embedded in the matrix material in a predetermined pattern, the matrix material comprising a monomer and the sacrificial material comprising a polymer;
   activating a region of the matrix material to initiate an exothermic polymerization reaction and generate a self-propagating polymerization front,
   wherein, as the polymerization front propagates through the matrix material and polymerizes the monomer, heat from the exothermic reaction degrades the sacrificial material into a gas-phase and/or liquid-phase byproduct, thereby rapidly forming one or more voids or channels having the predetermined pattern in the matrix material.

2. The method of claim 1, wherein the activating comprises exposing the region to heat, light and/or electric current.

3. The method of claim 1, wherein the activation is transient.

4. The method of claim 1, wherein the polymerization front moves at a rate of at least about 0.5 cm/min.

5. The method of claim 4, wherein the rate is at least about 20 cm/min.

6. The method of claim 1, wherein, prior to heating, the matrix material is in a liquid or gel state and the sacrificial material is in a solid state.

7. The method of claim 1, wherein the polymer of the sacrificial material is selected from the group consisting of: cyclic poly(pthalaldehyde) (cPPA), poly(vinyl butyl carbonate sulfone)s, and poly(propylene carbonate) (PPC).

8. The method of claim 1, wherein the sacrificial material further comprises a catalyst selected from the group consisting of a photo-acid generator, a thermal acid generator, photo/thermo base generator, and an organometallic catalyst.

9. The method of claim 1, wherein the matrix material further comprises a catalyst and an inhibitor, the catalyst comprising a $2^{nd}$ generation Grubbs catalyst, and the inhibitor being selected from the group consisting of: trimethyl phosphite (TMP), triethyl phosphite (TEP), triisopropyl phosphite (TIPP), tributyl phosphite (TBP), triphenyl phosphite (TPP), and/or 4-dimethylaminopyridine (DMAPF).

10. The method of claim 1, wherein, after frontal polymerization, the matrix material comprises a polymer selected from the group consisting of: an acrylate polymer, an epoxy polymer, a polyurethane and an olefin polymer.

11. The method of claim 1, wherein, after frontal polymerization, the matrix material comprises polydicyclopentadiene (pDCPD).

12. The method of claim 1, further comprising a reinforcement material embedded in the matrix material.

13. The method of claim 12, wherein the reinforcement material comprises one or more fibers, tows, and/or fabrics.

14. The method of claim 1, wherein, after initiation of the exothermic polymerization reaction, no external heating is utilized.

15. The method of claim 1, wherein the matrix material at the polymerization front reaches a temperature of 300° C. or less.

16. The method of claim 1, wherein, downstream of the polymerization front, the matrix material is at ambient temperature.

17. The method of claim 1, wherein the sacrificial material is partially embedded in the matrix material, such that the void or channel formed upon degradation comprises a vent for escape of the liquid-phase and/or gas-phase byproduct.

18. The method of claim 1, further comprising, prior to the providing the pre-vascularized structure, embedding the sacrificial material in the matrix material.

19. The method of claim 18, wherein embedding the sacrificial material in the matrix material comprises:
fabricating the sacrificial material in the predetermined pattern on a substrate or template; and
immersing the sacrificial material in or otherwise exposing the sacrificial material to the matrix material to achieve partial or full encapsulation of the sacrificial material, thereby forming the matrix material with the sacrificial material embedded therein.

20. The method of claim 19, wherein fabricating the sacrificial material in the predetermined pattern on the substrate or template comprises a technique selected from the group consisting of: 3D printing, electrospinning, solution spinning, melt-spinning, film deposition and patterning, and extrusion.

* * * * *